United States Patent [19]
Dumousseau et al.

[11] Patent Number: 4,605,547
[45] Date of Patent: Aug. 12, 1986

[54] CONTINUOUS HYDROGENATION OF LITHIUM INTO LITHIUM HYDRIDE

[75] Inventors: Jean-Yves Dumousseau, Paris; Jean Grosbois, L'Isle Adam; Serge Jacubert, Viroflay, all of France

[73] Assignee: Rhone-Poulenc Specialites Chimiques, Courbevoie, France

[21] Appl. No.: 707,153

[22] Filed: Mar. 1, 1985

Related U.S. Application Data

[62] Division of Ser. No. 527,834, Aug. 30, 1983.

[30] Foreign Application Priority Data

Aug. 31, 1982 [FR] France ................................ 82 14864

[51] Int. Cl.$^4$ .......................... C01B 6/04; C01F 15/00
[52] U.S. Cl. ...................................................... 423/646
[58] Field of Search ........................................ 423/646

[56] References Cited
U.S. PATENT DOCUMENTS 3,963,831 6/1976 Lenz et al. ......................... 423/646
4,041,136 8/1977 Franklin et al. .................... 423/646

Primary Examiner—H. T. Carter
Attorney, Agent, or Firm—Burns, Doane, Swecker & Mathis

[57] ABSTRACT

Lithium is continuously converted into lithium hydride, is suitable phase contactor/decanter apparatus, by continuously hydrogenating in a first reaction zone, at elevated temperatures, an agitated intimate admixture of metallic lithium in a mixture of molten salts, continuously discharging the effluent of said hydrogenation reaction to a second zone of decantation, whereby said effluent is separated into a floating light phase essentially consisting of unreacted lithium metal and a heavy phase which comprises product lithium hydride dissolved in said mixture of molten salts, continuously recycling floating light phase back to the hydrogenation reaction zone, continuously withdrawing heavy phase from said zone of decantation, and recovering product lithium hydride from said withdrawn heavy phase.

8 Claims, 1 Drawing Figure

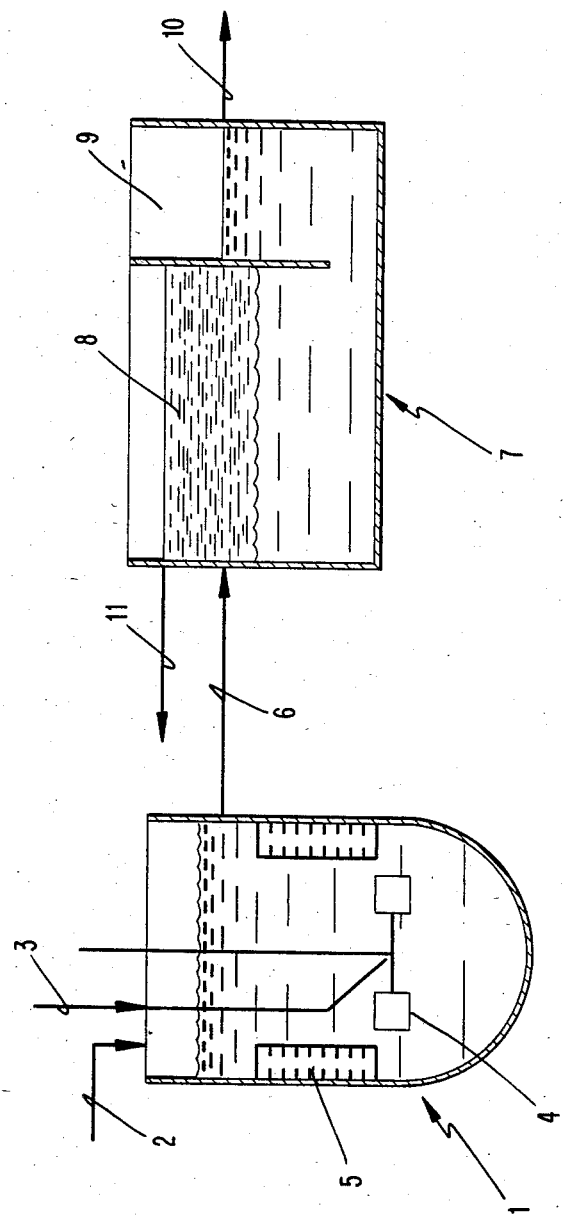

CONTINUOUS HYDROGENATION OF LITHIUM INTO LITHIUM HYDRIDE

This application is a division of application Ser. No. 527,834, filed Aug. 30, 1983.

BACKGROUND OF THE INVENTION

1. Field of the Invention:

The present invention relates to apparatus and process for the continuous hydrogenation of lithium in a mixture of molten salts for the preparation of lithium hydride within said mixture.

2. Description of the Prior Art:

It is well known to this art that lithium hydride is employed in a limited variety of chemical reactions. In particular, such is the case in the preparation of silane by reaction between chlorosilanes and said lithium hydride.

Within the ambit of such a process, the hydrogenation of lithium to form lithium hydride has already been described. For example, French Patent No. 2,365,518 features a process for the production of silane in an apparatus in which the hydrogenation of lithium floating on a mixture of molten salts of a eutectic composition is carried out, with the lithium hydride formed being admixed with the molten mass via stirring means, such as to provide a homogeneous mixture. According to this patented process, the operation is discontinuous, i.e., the lithium emanating from an electrolysis unit is hydrogenated and then reacted with chlorosilane, and the reactor is then charged with a fresh supply of lithium, which in its turn is hydrogenated.

Such a process, thus, does not permit of the continuous hydrogenation of lithium. Furthermore, the complete hydrogenation of lithium is very lengthy and requires conditions of agitation and temperature that are severe in view of the corrosion and mechanical strength of the materials.

SUMMARY OF THE INVENTION

Accordingly, a major object of the present invention is the provision of improved apparatus/process for the continuous hydrogenation of lithium metal under particularly advantageous operating conditions, especially with respect to temperature. Furthermore, and this circumscribes another object of the present invention, the lithium hydride obtained dissolved in the mixture of molten salts, is free of metallic lithium, which renders its subsequent use, in particular in a process for the production of silane, very attractive. Finally, the process of the invention permits the hydrogenation of lithium with excellent productivity in an apparatus of reduced size.

Briefly, if it is desired to carry out the hydrogenation of lithium under the conditions and with the advantages immediately above described, it has now been found, and this circumscribes yet another object of the invention, that said reaction may be carried out very advantageously in an agitated gas/liquid contact reactor, said reactor being combined with a decanter having a decantation surface S expressed in m² such that preferably the ratio S/Q ranges from 0.1 to 0.3 m²/m³/hour, with Q being the liquid flow rate expressed in m³/hour charged into the decanter, with the floating light phase being recycled in said reactor, while the residual heavy phase is withdrawn.

BRIEF DESCRIPTION OF THE DRAWING

The Figure of Drawing is a schematic/diagrammatic cross-sectional plan view of apparatus suitable for carrying out the process according to this invention.

DETAILED DESCRIPTION OF THE INVENTION

More particularly according to the present invention, the apparatus for the continuous hydrogenation of lithium in a mixture of molten salts consistent herewith is schematically illustrated in the accompanying single Figure of Drawing and is characterized in that it comprises:

(I) a hydrogenation reactor 1 equipped with stirring or agitation means 4, and provided with an inlet 2 for the continuous supply of a mixture of molten salts containing lithium and with an inlet 3 for the introduction of the hydrogen gas necessary for said hydrogenation; and (II) a decanter 7 into which is charged a feedstream Q, via the line 6, of the admixture emanating from the hydrogenation reactor 1, said decanter comprising a decantation zone 8 having a surface S, means 11 to withdraw the light phase by overflow, said light phase essentially consisting of lithium metal, and which is recycled to the reactor 1 via said overflow line 11, and means for withdrawing heavy phase effluent comprising tank 9 and overflow line 10.

The process utilizing the apparatus of the invention is characterized in that:

(i) the hydrogenation reactor is continuously supplied with hydrogen gas and the mixture of molten salts transporting the lithium, with the hydrogenation, per se, preferably being effected at a temperature ranging from 470° C. to 510° C.;

(ii) the mixture emanating from the hydrogenation reactor containing lithium hydride, unreacted metallic lithium and the mixture of molten salts is continuously introduced into the decanter;

(iii) in said decanter, the floating lithium is continuously recycled back into the hydrogenation reactor, while the lithium hydride which is formed and dissolved in the mixture of molten salts, is withdrawn.

The mixture of molten salts used according to the invention comprises lithium chloride and at least one other alkali metal and/or alkaline earth metal chloride. The mixture is preferably at about the eutectic composition of lithium chloride and potassium chloride.

The mixture introduced into the hydrogenation reactor preferably further comprises a maximum of 21 moles of lithium per each 100 moles of the mixture of molten salts, in order to maintain the fluidity necessary for the satisfactory operation of the apparatus.

According to another embodiment of the invention, it is equally possible in the subject hydrogenation apparatus and by a similar process to effect the hydrogenation of lithium/calcium alloys containing at least 50 mole % of lithium. In this particular embodiment, a mixture of molten salts of a eutectic composition, based on lithium chloride and calcium chloride and at least one other alkali metal and/or alkaline earth metal chloride, is preferably employed.

And in another embodiment of the invention, an integrated apparatus is envisaged, wherein the same operations are carried out in a number of different chambers: 1, 2, 3, etc.

The preferred hydrogenation apparatus according to the invention shall be further described hereinbelow, again with reference to the single Figure of Drawing.

In said Figure of Drawing, schematically shown are:

(I) the hydrogenation reactor 1 proper, said reactor comprising a feed line 2 through which the mixture of molten salts containing the lithium to be hydrogenated is introduced, a hydrogen inlet 3 and means for inducing violent or intense agitation consisting of an agitator 4 proper and of counterblades 5 attached to the sidewalls of the reactor; and (II) a decanter 7 which is supplied at a flow rate Q with the mixture issuing over the course of the reaction from the reactor 1; this mixture comprises the mixture of molten salts, lithium and lithium hydride dissolved in said salts, said decanter 7 comprising a decantation zone 8 having a surface S, means to withdraw and recycle the light phase via overflow line 11, and means to withdraw the heavy phase, comprising a tank 9 and an overflow line 10.

The decanter 7 is designed such that the physical separation (decantation) of the lithium present in the mixture, is effected from the remainder of the mixture thereon; the surface S of said decantation zone 8 being such that $0.1 \leq S/Q \leq 0.3$. In the decantation zone 8 the physical separation of the lithium that has not undergone hydrogenation from the remainder of the mixture is effected, said lithium metal being recycled via the conduit 11 back into the reactor 1.

In order to further illustrate the present invention and the advantages thereof, the following specific example is given, it being understood that same is intended only as illustrative and in nowise limitative.

EXAMPLE

A reactor 1 was continuously supplied, on the one hand and via the line 2, with 2.31 k mole/hour of a mixture containing 1.07 k mole/hour of LiCl, 0.84 k mole/hour of KCl and 0.4 k gram atom/hour of Li and, on the other hand and via the line 3 with 0.2 k mole/hour of hydrogen gas.

The flow rate of the feed 6 into the decanter 7 was approximately 120 kg/hour, of which approximately 10 kg/hour was unhydrogenated lithium, which, after decantation in the zone 8 of said decanter 7, was recycled via line 11 back into the reactor 1.

The flow rate via the outlet line 10 of the decanter was identical to the inlet flow rate, with the mixture containing no more lithium, but comprising 0.4 mole kg/hour of lithium hydride.

The surface of the zone 8 of the decanter 7 was $10^{-2}$ m$^2$; the height in said zone 8 of the band of coalescence was approximately $10^{-1}$ m.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the continuous preparation of lithium hydride, which comprises continuously hydrogenating in a first reaction zone, at elevated temperatures, an agitated intimate admixture of metallic lithium in a mixture of molten salts, continuously discharging the effluent of said hydrogenation reaction to a second zone of decantation, whereby said effluent is separated into a floating light phase essentially consisting of unreacted lithium metal and a heavy phase which comprises product lithium hydride dissolved in said mixture of molten salts, continuously recycling floating light phase back to the hydrogenation reaction zone, continuously withdrawing heavy phase from said zone of decantation, and recovering product lithium hydride from said withdrawn heavy phase.

2. The process as defined by claim 1, said hydrogenation reaction zone comprising a gas/liquid phase contactor.

3. The process as defined by claim 2, said mixture of molten salts comprising lithium chloride and at least one other alkali or alkaline earth metal chloride.

4. The process as defined by claim 3, said mixture of molten salts being essentially eutectic in composition.

5. The process as defined by claim 3, the hydrogenation reaction admixture comprising up to 21 moles of lithium per each 100 moles of the mixture of molten salts.

6. The process as defined by claim 3, the hydrogenation reaction admixture comprising a lithium/calcium alloy containing at least 50 mole % of lithium.

7. The process as defined by claim 3, said zone of decantation having a decantation surface S, in m$^2$, and the ratio S/Q ranging from 0.1 to 0.3 m$^2$/m$^3$/hour, with Q being the rate of flow, in m$^3$/hour, of the discharge of the effluent of said hydrogenation reaction into the zone of decantation.

8. The process as defined by claim 7, said hydrogenation being carried out at a temperature ranging from about 470° to 510° C.

* * * * *